United States Patent [19]
Cheng

[11] Patent Number: 6,073,945
[45] Date of Patent: Jun. 13, 2000

[54] SWITCHING DEVICE FOR A STROLLER HANDLE

[75] Inventor: Ying-Hsiung Cheng, Tainan Hsien, Taiwan

[73] Assignee: Top Fortune Ltd., San Diego, Calif.

[21] Appl. No.: 09/111,586

[22] Filed: Jul. 7, 1998

[51] Int. Cl.[7] ..................................................... B62B 9/20
[52] U.S. Cl. .......................................... 280/47.36; 403/93
[58] Field of Search ............................. 16/436, 437, 438, 16/900; 280/47.36, 47.39, 47.371; 403/93, 96

[56] References Cited

U.S. PATENT DOCUMENTS

| | | | |
|---|---|---|---|
| 1,261,859 | 4/1918 | Seiter | 403/93 |
| 1,389,249 | 8/1921 | Kitchel | 403/93 |
| 2,419,719 | 4/1947 | Kennedy | 403/93 |
| 3,115,359 | 12/1963 | Hendrick | 403/93 |
| 5,163,275 | 11/1992 | Hare et al. | 280/47.36 |
| 5,257,799 | 11/1993 | Cone et al. | 280/47.36 |
| 5,513,864 | 5/1996 | Huang | 280/47.36 |
| 5,645,293 | 7/1997 | Cheng | 280/47.36 |
| 5,845,924 | 12/1998 | Huang | 280/47.36 |

Primary Examiner—Anthony Knight
Assistant Examiner—Donald M. Gurley
Attorney, Agent, or Firm—Rosenberg, Klein & Lee

[57] ABSTRACT

The switching device for a stroller handle includes an inserting element coupled to a pivotal connector of the stroller, a slider block slidably connected to the inserting element, urged by a spring to stay in a normally lower position thereof and an orientating block pivotally connected to the pivotal connector coupled to the stroller handle and having two engaging gaps, the slider block being provided with a nut and a finger press part, the nut being either retained within one of the engaging gaps to restrain the orientating block from turning or disengaged from the engaging gaps, by pushing the finger press part upwardly, to release the orientating block from the restraint for turning the same to switch the handle.

3 Claims, 7 Drawing Sheets

SWITCHING DEVICE FOR A STROLLER HANDLE

BACKGROUND OF THE INVENTION

The present invention relates to a switching device for a stroller handle. Heretofore known strollers are either foldable or unfoldable, foldable strollers being able to be folded to a small size for easy storage, however, neither of both are devised to have a switching handle that can be changed or switched as to its orientation to be in either a forward position or rear position.

Through experience in using a stroller to carry a baby therein, it is found a baby lying on the stroller with his face facing the stroller moving direction cannot be clearly seen as to his action such as playing toys or drinking from a baby's bottle and make a mother worry about the baby's safety when the mother is pushing the stroller behind the stroller.

SUMMARY

The present invention provides a switching device for a stroller handle so that the stroller handle can be switched to either a traditional position under which the user pushes the stroller from a rear side of the stroller or a new position aimed in the present invention under which the user can push the stroller from a front side thereof so that he/she can see the baby lying therein much more clearly as to its action such as playing toys or drinking from a baby's bottle due to reduction of sunshade obstruction to the eyes under such position.

The switching device of the stroller handle of the present invention includes an inserting element coupled to a pivotal connector of the stroller, a slider block slidably connected to the inserting element and urged by a spring to stay in a normally lower position thereof, and an orienting block pivotally connected to the pivotal connector coupled to the stroller handle and having two engaging gaps, the slider block being provided with a nut and finger press part, the nut being either retained within one of the engaging gaps to restrain the orienting block from turning or disengaged from the engaging gaps, by pushing the finger press part upwardly, to release the orienting block from the engagement with the nut for the orienting block to be capable of turning so as to switch the handle, the spring being capable of resiliently forcing the slider block to move downward to engage the nut with the orienting block after the user release the fingers from the finger press part.

BRIEF DESCRIPTION OF THE DRAWINGS

The present invention will be better understood by referring to the accompanying drawings, wherein.

DETAILED DESCRIPTION OF THE PREFERRED EMBODIMENTS

A switching device for a stroller handle of the present invention includes an inserting elements 4, an orienting block 5, a slider block 6 and an upper pivotal connector 7.

Figure 3:
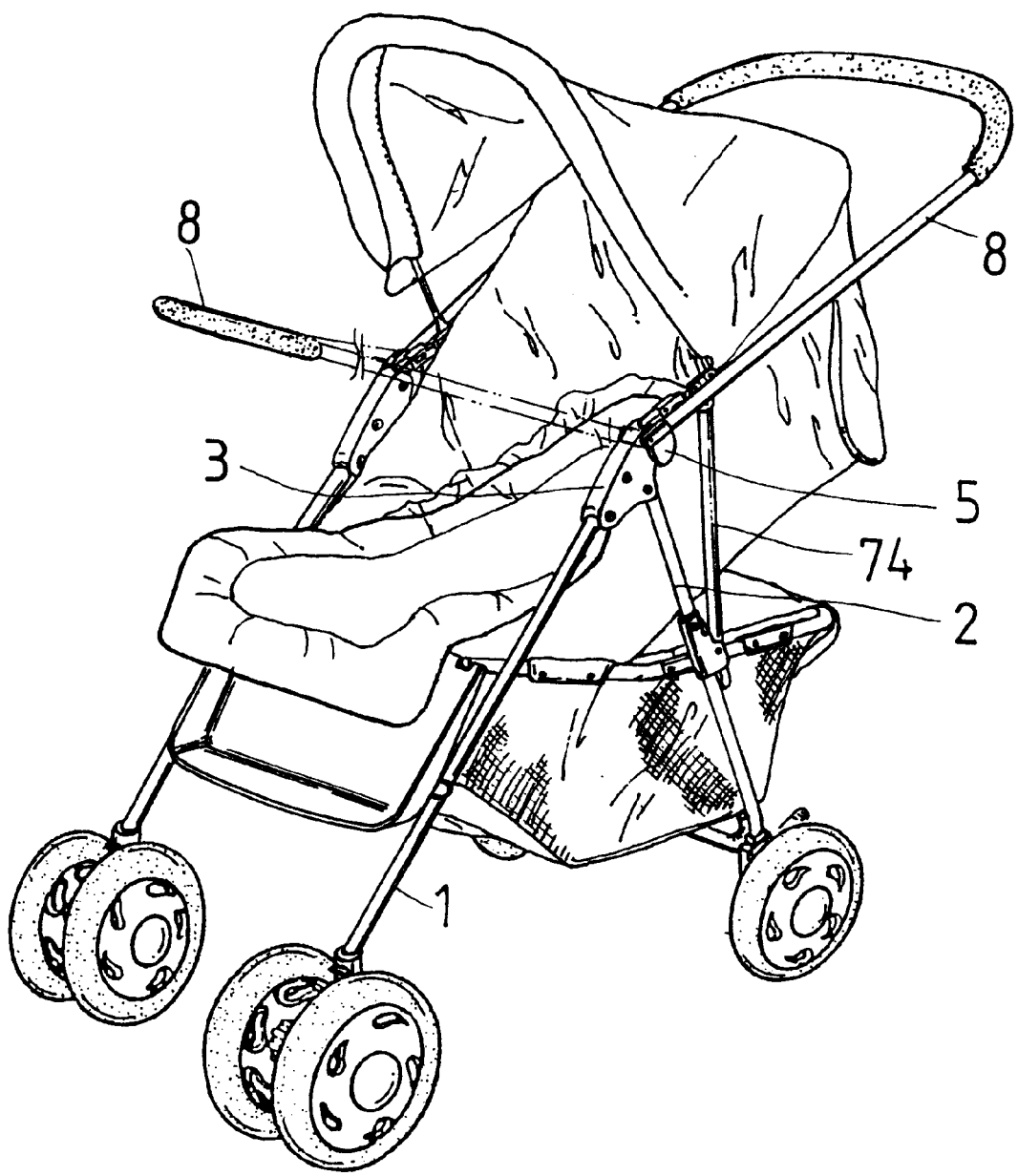
FIG. 3 is a perspective view of a stroller of the present invention, showing the switching movement of the handle.
Figure 4:
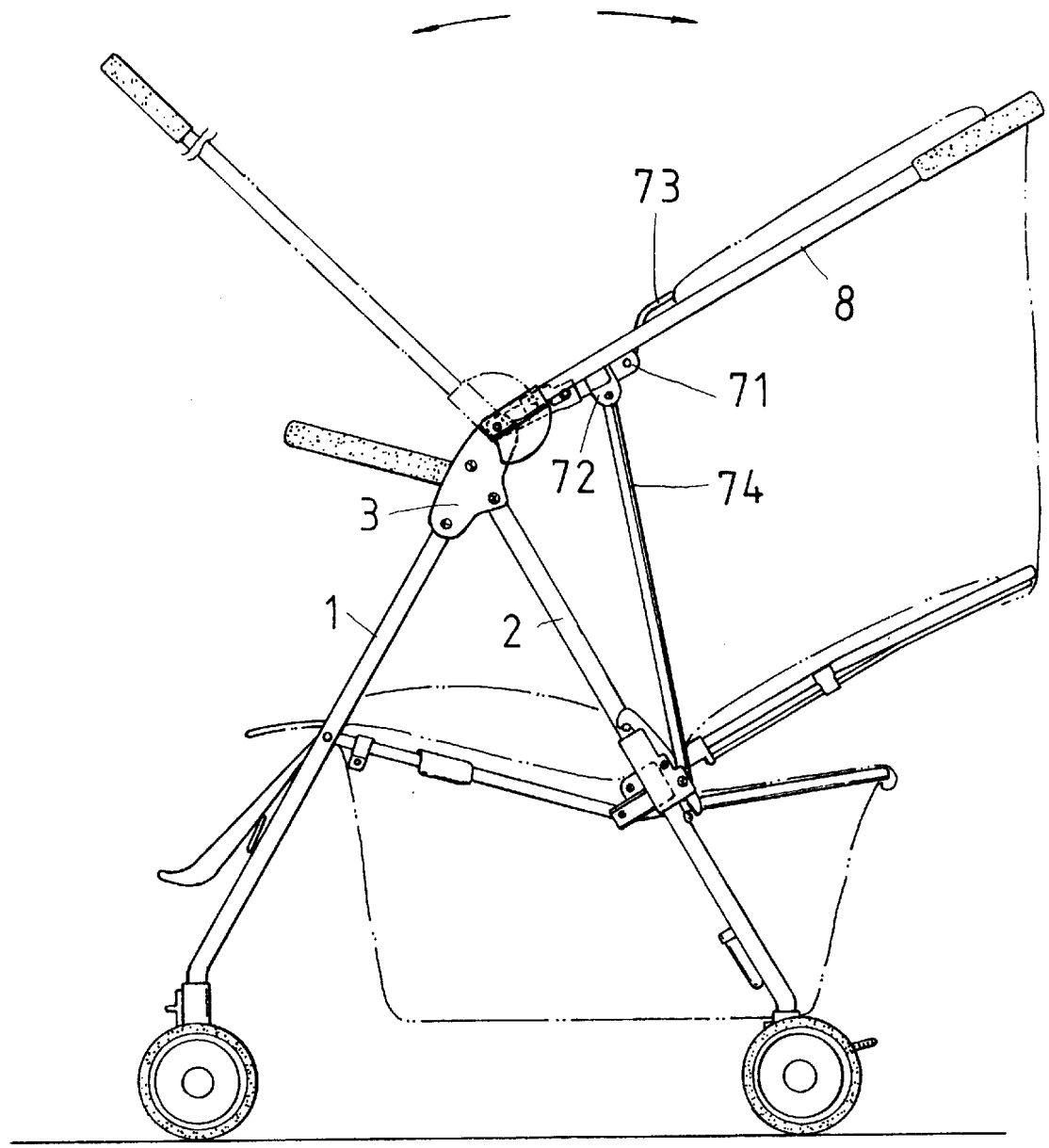
FIG. 4 is a side view of the stroller of the present invention, showing the switching movement of the handle.
Figure 5:
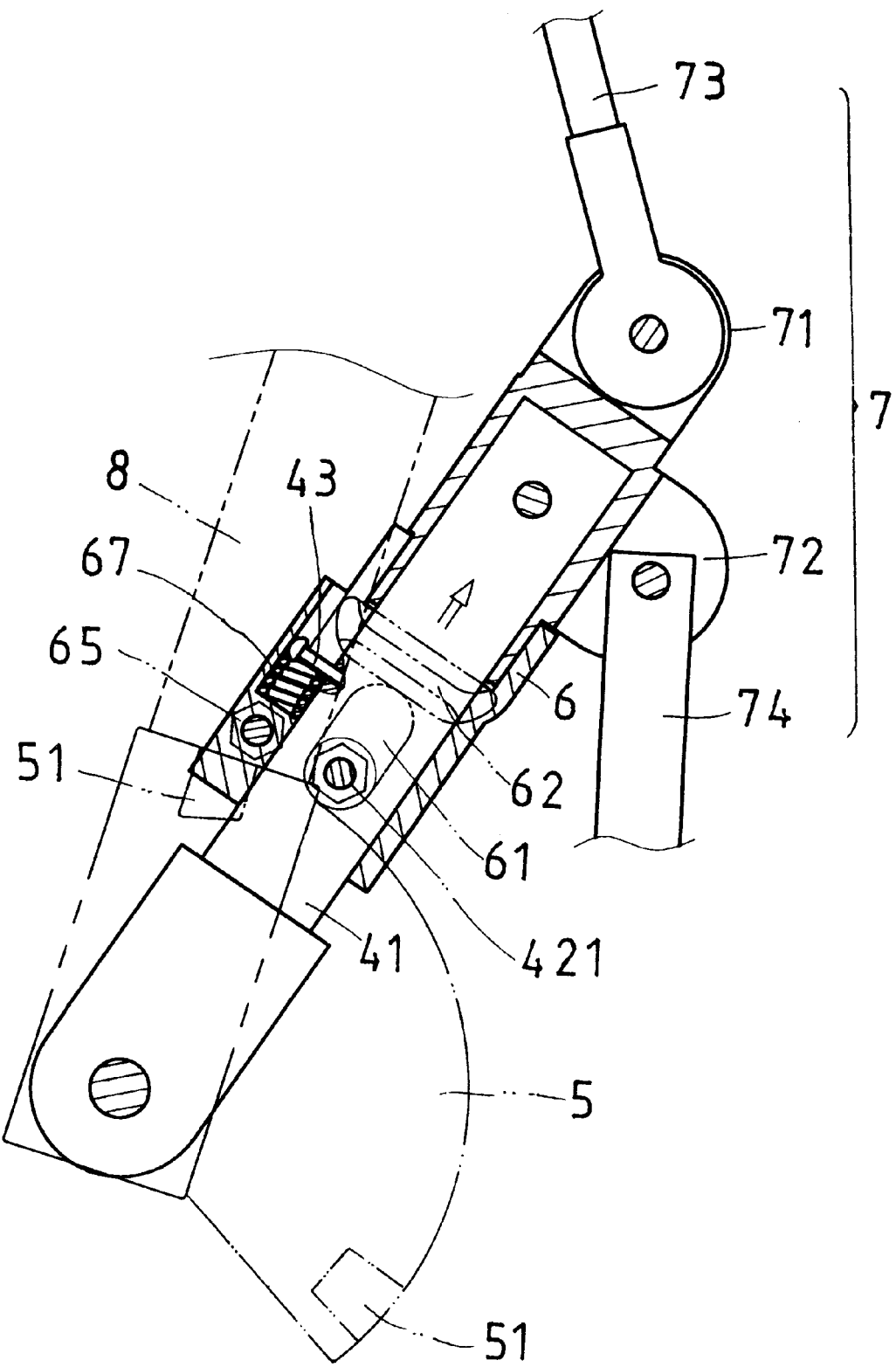
FIG. 5 is a view showing the switching device under turning operation step 1.

The switching device is fitted to a stroller, referring to FIGS. 3 and 4, from one of two pivotal connectors 3 of the stroller; the stroller has front support rods 1 and rear support rods 2 each connected to a respective wheel and pivoted to the pivotal connectors 3.

Figure 1:
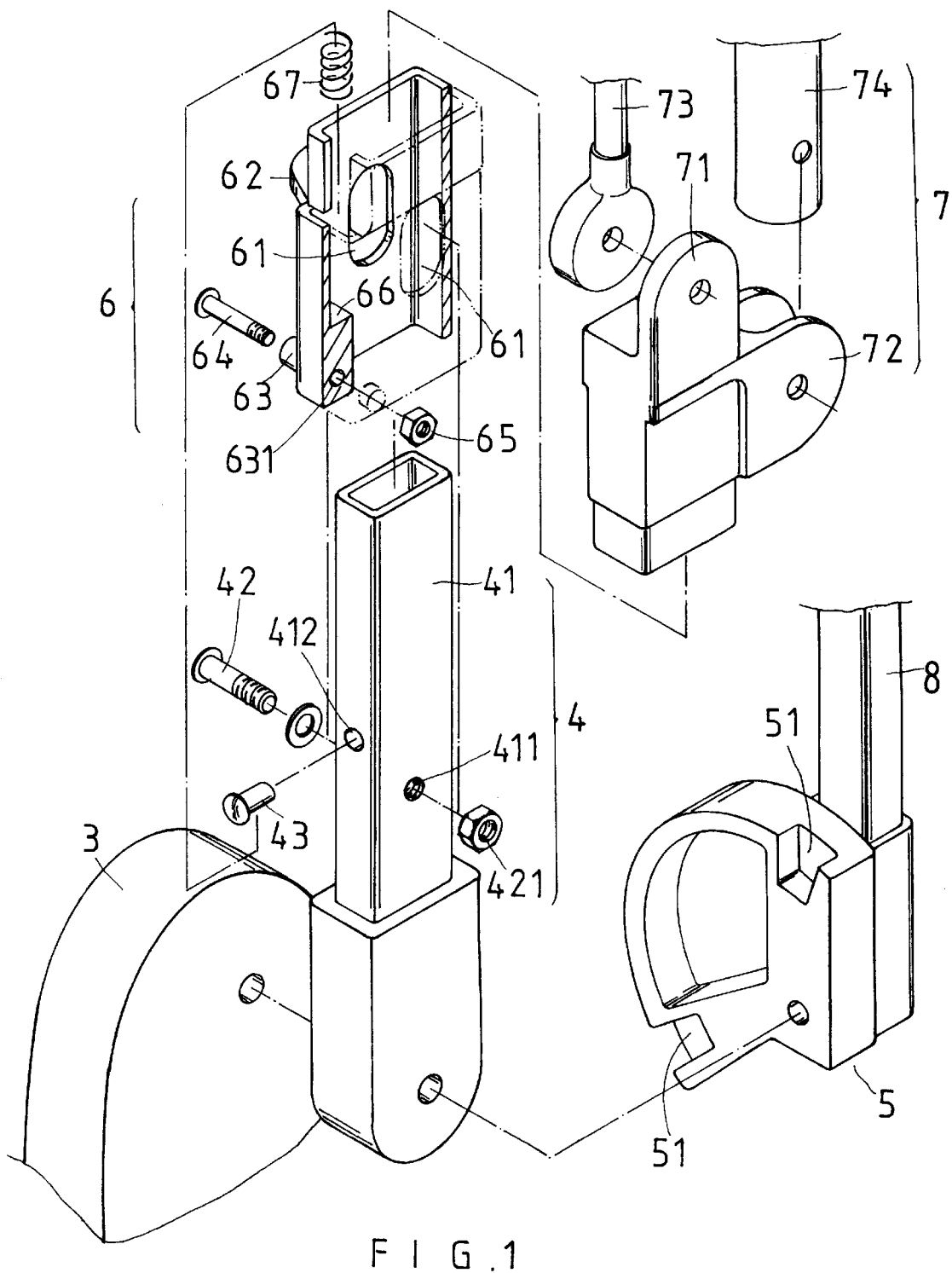
FIG. 1 is an exploded perspective view of a switching device for a stroller handle of the present invention.

Now, referring the FIG. 1, the inserting element 4 is connected to the respective pivotal connector 3 on lower part thereof and has an inserting connecting part 41 forming the upper part thereof; the inserting connecting part 41 has a through hole 411 and a rivet hole 412.

The slider block 6 has two retangular holes 61,61 on two sides thereof, a finger press part 62 projecting outwardly, a protrusion 63 and a through hole 631; a bolt 64 is provided, inserted through the through hole 631 and coupled with a nut 65 so that the bolt 64 and the nut 65 are fixed on the slider block 6.

The orienting block 5 is substantially of sector shape and has two engaging gaps 51 on edges thereof. A pushing handle 8 of the stroller is connected to the orienting block 5.

The upper pivotal connector 7 has two holed projections 71, 72; a sunshade support 73 is pivotally connected to the holed projection 71 and a mediate support 74 of the stroller is pivotally connected to the holed projection 72.

Figure 2:
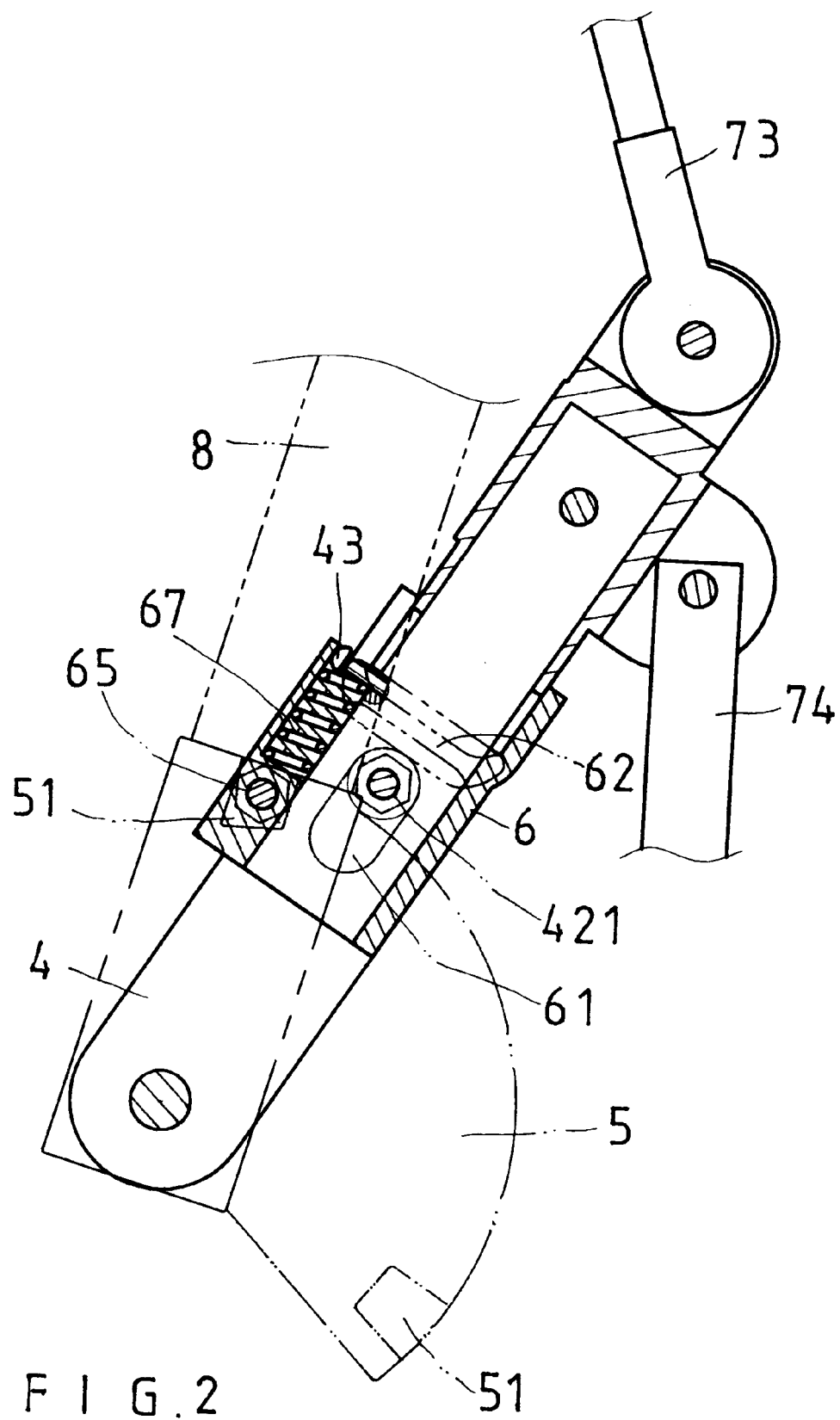
FIG. 2 is a cross sectional view of a switching device for the stroller handle of the present invention.

In combination, the inserting element 4 and the orienting block 5 are connected to the respective pivotal connector 3 with the orienting block 5 being capable of pivoting on the joint; the inserting connecting part 41 of the inserting element 4 is passed through the slider block 6, and then a bolting element 42 and a nut 421 is coupled with the through hole 411 of the inserting element; furthermore a spring 67 is provided, disposed on the supporting platform 66 of the slider block 6 and obstructed from going out of the slider block 6 by means of a rivet 43 fixed in the rivet hole 412 of the inserting element 4 above the spring 67. Then the upper pivotal connector 7 is inserted with the inserting connecting part 41 of the inserting element 4. Thus, the spring 67 will force the slider block 6 downwardly with the bolting element 42 touch upper ends of the retangular holes 61 and the nut 65 received within one of the engaging gaps 51 depending on the orienting of the orientating block 5, as shown on FIG. 2.

Figure 6:
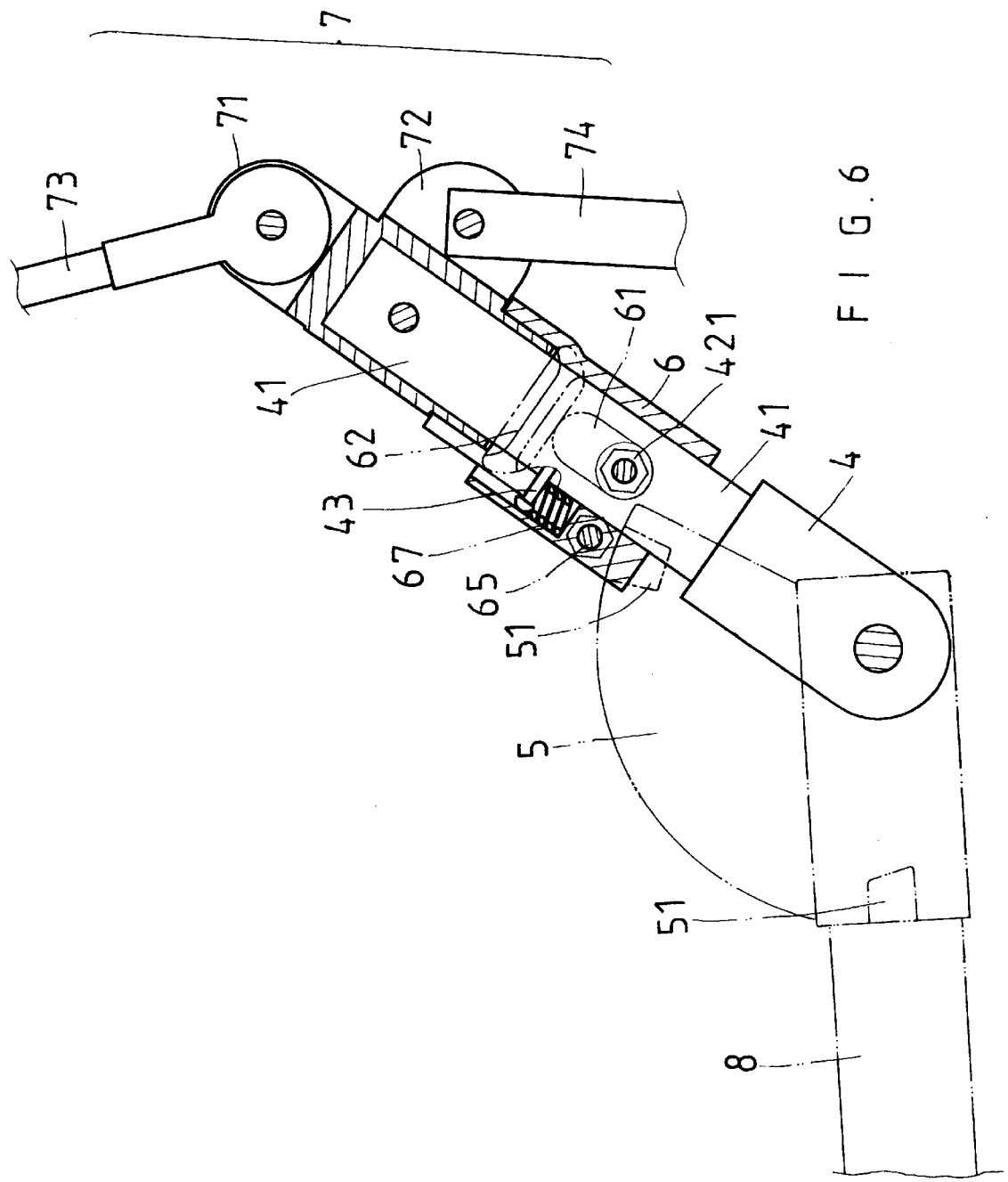
FIG. 6 is a view showing the switching device under turning operation step 2; and, FIG. 7 is a view showing the switching device under turning operation step 3.
Figure 7:
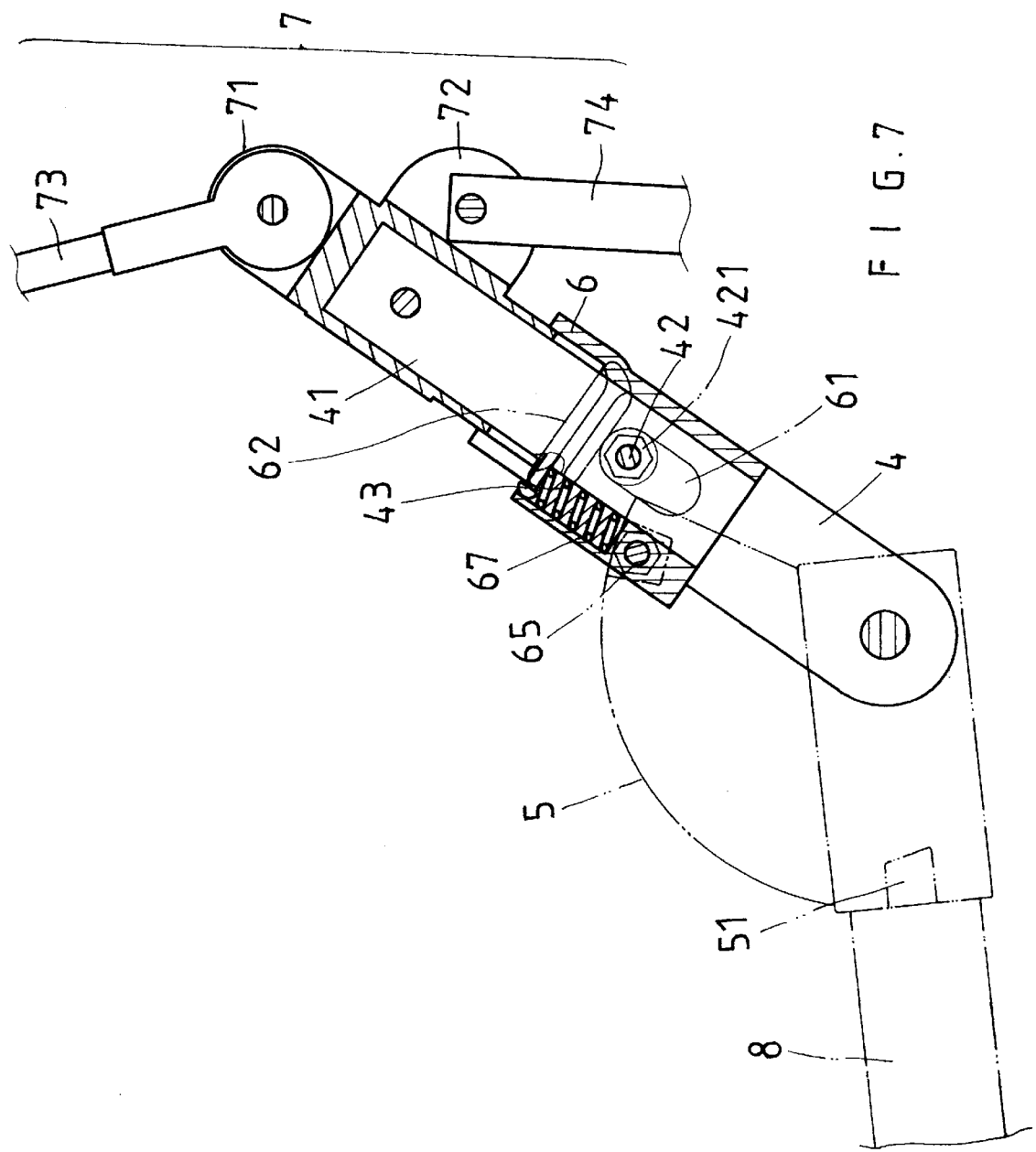

In operating the switching device of the present invention to change the direction of the pushing handle 8 of the stroller, referring to FIGS. 3, 4, 5, 6 and 7, the operator pushes the finger press part 62 upwards to move the slider block 6 in the same direction so as to disengage the nut 65 from one of the engaging gaps 51. Thus, the operator can switch the pushing handle 8, as shown in FIG. 6, to bring the other one of the engaging gaps 51 to under to the nut 65. Then, the operator releases the finger press part 62 so that the spring 67 resiliently forces the slider block 6 downwardly to bring the nut 65 into engagement with the engaging gaps 51 thereunder; thus, the pushing handle 8 is switched to the other direction, i.e. either the normal direction provided in heretofore known strollers of which the user must push the strollers from rear parts thereof, or the alternative direction provided in a stroller of the present invention of which the user can push the stroller from front part thereof so as to be able to look at the baby while pushing.

From the above description, it can be understood the switching device of the stroller has the following advantages:

1. The user can easily switch the pushing handle to the direction aimed in the present invention, depending on his/her need, when he/she hopes to be able to see the actions of the baby in the stroller more clearly without the obstruction of the sunshade to the eyes.
2. The pushing handle can be switched directly in operating the switching device because it is connected to the orienting block, a part of the switching device, making the switching operation very uncomplicated.

What is claimed is:

1. A reconfigurable handle lock assembly for a stroller comprising:

(a) an inserting element having a longitudinally extended connecting portion and a restraining portion protruding transversely therefrom;

(b) a transversely extending fastening element coupled to said inserting element;

(c) an orienting block for supporting a stroller handle pivotally coupled to said inserting element, said orienting block being pivotally displaceable relative to said inserting element between at least a first angular position and a second angular position, said orienting block having formed therein at least a pair of engaging gap recesses angularly offset one from the other;

(d) a slider block slidably coupled to said connecting portion of said inserting element, said slider block being longitudinally displaceable relative to said connecting portion of said inserting element between longitudinally displaced first and second actuation positions, said slider block having a sidewall portion and a platform portion extending transversely inward therefrom, said sidewall portion having formed therein at least one slot receiving said fastening element therethrough, said slot having a pair of longitudinally opposed edges respectively engaging said fastening element when said slider block is disposed alternatively in said first and second actuation positions, said slider block including an engagement nut protruding therefrom for releasably engaging one of said orienting block engaging gap recesses when said slider block is disposed in said first actuation position; and, (e) a spring element captured between said restraining portion of said inserting element and said platform portion of said slider block for biasing said slider block to said first actuation position thereof;

whereby said orienting block is selectively disposed in pivotally locked and released manner responsive to the longitudinal position of said slider block relative to said inserting element.

2. The reconfigurable handle lock assembly as recited in claim 1 further comprising an upper pivotal connector coupled to said inserting element, said upper pivotal connector including at least a pair of projections for respectively supporting a sunshade and a mediate support of the stroller.

3. The reconfigurable handle lock assembly as recited in claim 1 wherein said restraining portion of said inserting element includes a rivet.

* * * * *